Nov. 20, 1956 G. W. GALLEY 2,770,975
SERVO MECHANISMS
Filed Nov. 8, 1954 2 Sheets-Sheet 1

INVENTOR
GORDON WILLIAM GALLEY
BY
Campbell, Brumbaugh
Free and Graves
HIS ATTORNEYS Nov. 20, 1956  G. W. GALLEY  2,770,975
SERVO MECHANISMS
Filed Nov. 8, 1954  2 Sheets-Sheet 2
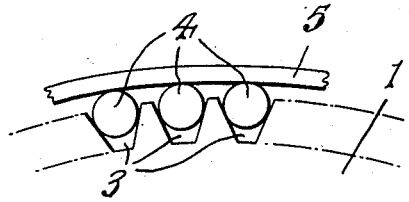
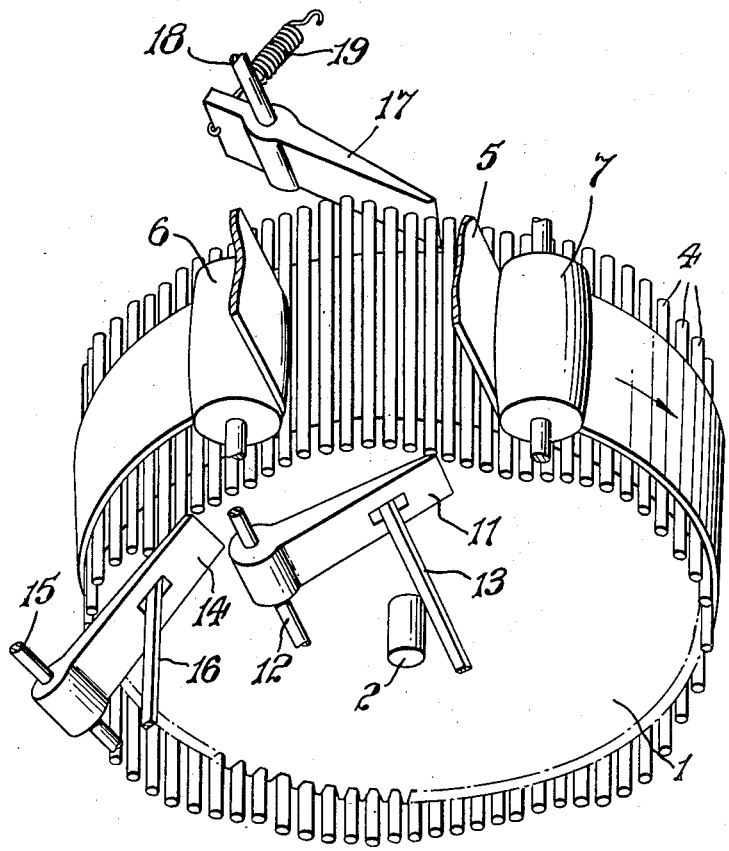
INVENTOR
GORDON WILLIAM GALLEY
BY
HIS ATTORNEYS

United States Patent Office 2,770,975
Patented Nov. 20, 1956

2,770,975

SERVO MECHANISMS

Gordon William Galley, Wavertree, Liverpool, England, assignor to Unilever Limited, Port Sunlight, England, a British company Application November 8, 1954, Serial No. 467,471

Claims priority, application Great Britain November 10, 1953

9 Claims. (Cl. 74—96)

This invention relates to servo mechanisms.

It is an object of the present invention to provide a simple servo mechanism which can be adapted to produce at least one of the following effects, namely (a) To introduce a time lag into the transmission of a continuously variable mechanical signal, (b) To produce power amplification of a mechanical signal, and (c) To store and continuously repeat a mechanical signal.

According to the present invention there is provided a servo mechanism comprising a rotatable member having a plurality of channels substantially equally spaced on a substantially common pitch circle, a plurality of rods one situated in each channel, means for securely holding the rods in their channels to prevent axial displacement of the rods over an arc of said pitch circle, said rods being capable of axial displacement over the remaining arc of said pitch circle, signal input means arranged to displace the rods axially in said remaining arc, signal output means arranged to be displaced by the rods in the securely held arc, and aligning means in line with or in front of the signal input means to move the rods axially in said remaining arc towards the signal input means.

The axes of the channels are preferably parallel to the axis of rotation of the rotatable member.

The signal output means is preferably on the same end face of the rotatable member as the signal input means. However, provided all the rods are of the same length, the signal output means may for some applications be on the end face of the rotatable member opposite to that on which the signal input means is situated.

References to the aligning means being in front of the signal input means are intended to indicate that each rod reaches the aligning means before it reaches the signal input means.

Should it be desired to alter the time lag, the speed of rotation of the rotatable member or the length of the arc between the signal input means and the signal output means are adjusted.

Should the servo mechanism be required to store and then continuously to repeat a mechanical signal, which may be a function of some process variable, e. g. the temperature of a batch process, then, after the rotatable member has been rotated once and has recorded the signal, both the signal input means and the aligning means are made inoperative.

A preferred embodiment of the invention will now be described with reference to the accompanying drawings in which:

Fig. 4 shows on an enlarged scale an end view of a portion of the rotatable member, and Fig. 5 shows an isometric view of the apparatus with the tension pulley and plates omitted.

Figures 1, 2:
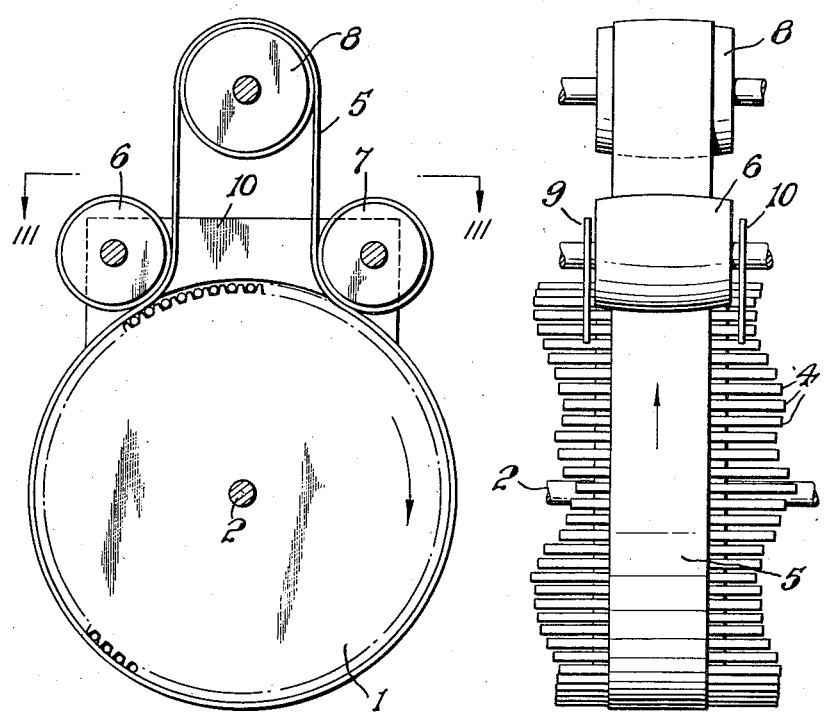
Fig. 1 shows a side view of the apparatus with the signal input and output means and the aligning means omitted.
Fig. 2 shows an end view of the apparatus shown in Fig. 1.
Figure 3:
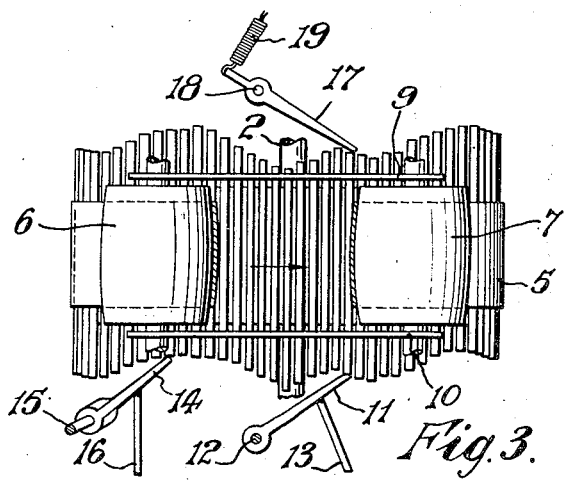
Fig. 3 shows a section on the line III:III of Fig. 1 including the signal input and output means and the aligning means.

Referring to the drawings, the rotatable member is in the form of a drum 1, which is arranged to rotate on a shaft 2. The drum has a plurality of grooves 3 (Fig. 4), in which are located the rods 4, equally spaced around its circumference. In a particular example the drum had a diameter of 6" and a width of 2"; the number of grooves was 100, the diameter of the rods ⅛" and the length of the rods 3".

The means for securely holding the rods in their grooves against axial displacement comprises an endless belt 5 of rubber or leather tightly held against the rods by pulleys 6 and 7 and the tension pulley 8. In the particular example the length of the securely held arc was 300°.

The means for retaining the rods in their grooves over the remaining arc, whilst permitting axial displacement of the rods, comprise two plates 9 and 10 situated in the smaller portion of the circumference between pulleys 6 and 7. A small clearance is provided between the lower edges of these plates and the rods. Furthermore, as the retained arc is uppermost, the rods are also retained in their grooves by gravity.

The signal input means are in the form of a shoe 11 rotatable about a spindle 12. The signal consisting of a random to-and-fro motion is applied to the shoe by means of a bar 13 connected to it. The signal output means comprise similarly a shoe 14 rotatable about a spindle 15 and provided with a bar 16. The aligning means are in the form of a shoe 17 rotatable about a spindle 18. The shoe 17 is forced against the ends of the rods by means of a spring 19 to push the rods against a signal input shoe 11.

If desired, the input and/or output signal shoe may be clamped to its spindle and the corresponding bar or bars omitted. In that case the input and/or output signal is obtained by rotation of the spindle.

The operation of the servo mechanism can be explained in a simple manner by considering what happens in a full revolution of drum 1 to any given one of the rods 4 as, say, the rod 4 shown as contacted by shoes 11 and 17 in Fig. 5. In the position shown in this figure, the rod is freely movable in its groove 3, and the shoe 17 accordingly urges the rod in a direction towards the right, in terms of the view afforded by Fig. 2, against the input shoe. Thus the rod is made to occupy a position which is representative of the value of input signals applied to bar 13. The rod remains set in its new position as drum 6 rotates clockwise (Fig. 1) to carry the rod under the holding belt 5.

Continued rotation of drum 6 brings the considered rod, still held by belt 5, into a position opposite shoe 14. In this position, the rod contacts shoe 14 to adjust the leftward displacement of this shoe to the same value as the leftward displacement of the rod itself. Shoe 14 will, accordingly, impart to bar 16 an output signal displacement which duplicates the input signal applied to bar 13. Since the rod when it contacts shoe 14 is securely held by belt 5, the rod in adjusting shoe 14 can exert a substantially greater force on the shoe than the force which was exerted on the rod by shoe 11 to cause the original displacement of the rod. Thus, in addition to the time lag, an amplifying effect is obtained between the input signal on bar 13 and the output signal on bar 16.

Further rotation of drum 1 carries the considered rod back into contact with shoes 11 and 17. At this time, the rod will be given a new leftward displacement by shoe 11 in accordance with the then-existing value of the input signal on bar 13. The rod then goes through another cycle of events similar to that already described.

Although a tensioned belt is the preferred means for securely holding the rods, it will be evident that other means may also be employed.

I claim:

1. A servo mechanism comprising in combination a rotatable member having a plurality of channels substantially equally spaced on a substantially common pitch circle, a plurality of rods one situated in each channel, means for securely holding the rods in their channels to prevent axial displacement of the rods over an arc of said pitch circle, said rods being capable of axial displacement over the remaining arc of said pitch circle, signal input means arranged to displace the rods axially in said remaining arc, signal output means arranged to be displaced by the rods in the securely held arc, and aligning means in line with or in front of the signal input means to move the rods axially in said remaining arc towards the signal input means.

2. A servo mechanism as claimed in claim 1 including means for retaining the rods in their channels so as to permit axial displacement of the rods over said remaining arc.

3. A servo mechanism as claimed in claim 2 in which the axes of the channels are substantially parallel to the axis of rotation of the rotatable member.

4. A servo mechanism comprising in combination a rotatable member having a plurality of channels substantially equally spaced on a substantially common pitch circle, the axes of said channels being substantially parallel to the axis of rotation of the rotatable member, a plurality of rods one situated in each channel, means for securely holding the rods in their channels to prevent axial displacement of the rods over an arc of said pitch circle, means for retaining the rods in their channels to permit axial displacement over the remaining arc of said pitch circle, signal input means arranged to displace the rods axially in said retained arc, signal output means arranged to be displaced by the rods in the securely held arc, said signal input means being situated on the same end face of the rotatable member as said signal output means, and aligning means spaced around said pitch circle from said signal output means in the same direction as and by at most the same amount as said signal input means is spaced from said signal output means, said aligning means being adapted to move the rods axially in said retained arc towards the signal input means.

5. A servo mechanism as claimed in claim 4 in which the aligning means is situated on the end face of the rotatable member opposite to that on which the signal input means is situated.

6. A servo mechanism as claimed in claim 5 in which that part of the aligning means in operative contact with a rod is spaced in the same position around said pitch circle as that part of said signal input means in operative contact with that rod.

7. A servo mechanism comprising in combination a rotatable member having a plurality of grooves at the circumference of said member substantially equally spaced on a substantially common pitch circle, a plurality of rods one situated in each groove, means for securely holding the rods in their grooves to prevent axial displacement of the rods over an arc of said pitch circle, means for retaining the rods in their grooves to permit axial displacement over the remaining arc of said pitch circle, signal input means arranged to displace the rods axially in said retained arc, signal output means arranged to be displaced by the rods in the securely held arc, and aligning means spaced around said pitch circle from said signal output means in the same direction as and by at most the same amount as said signal input means is spaced from said signal output means, said aligning means being adapted to move the rods axially in said retained arc towards the signal input means.

8. A servo mechanism as claimed in claim 7 in which the means for securely holding the rods in their grooves comprise a tensioned flexible belt.

9. A servo mechanism as claimed in claim 8 in which the signal input means and the signal output means each comprise a shoe and a spindle, the shoe being mounted on the spindle, and the end of the shoe remote from the spindle being arranged to contact the ends of the rods.

References Cited in the file of this patent
UNITED STATES PATENTS

| | | |
|---|---|---|
| 2,315,171 | Voorheis | Mar. 30, 1943 |
| 2,484,331 | Bels | Oct. 11, 1949 |